United States Patent
Alabdrabalnabi et al.

(10) Patent No.: US 11,663,555 B2
(45) Date of Patent: May 30, 2023

(54) METHOD AND SYSTEM FOR MANAGING APPROVAL WORKFLOW PROCESSES IN A NETWORK SYSTEM

(71) Applicant: Saudi Arabian Oil Company, Dhahran (SA)

(72) Inventors: Ali H. Alabdrabalnabi, Qatif (SA); Isa M. Almarzoug, Safwa (SA); Ali A. Alkhwaildi, Safwa (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 162 days.

(21) Appl. No.: 16/912,004

(22) Filed: Jun. 25, 2020

(65) Prior Publication Data

US 2021/0406831 A1 Dec. 30, 2021

(51) Int. Cl.
| | |
|---|---|
| *G06Q 10/10* | (2023.01) |
| *G06Q 10/0633* | (2023.01) |
| *G06F 16/2455* | (2019.01) |
| *G06Q 10/0631* | (2023.01) |
| *G06Q 10/105* | (2023.01) |

(52) U.S. Cl.
CPC ..... *G06Q 10/103* (2013.01); *G06F 16/24564* (2019.01); *G06Q 10/0633* (2013.01); *G06Q 10/063114* (2013.01); *G06Q 10/105* (2013.01)

(58) Field of Classification Search
CPC .......................... G06Q 10/0633; G06Q 10/103
See application file for complete search history.

(56) References Cited

U.S. PATENT DOCUMENTS

| 8,117,334 B2 | 2/2012 | Calderone et al. |
| 8,151,206 B2 | 4/2012 | Alimpich et al. |
| (Continued) | | |

FOREIGN PATENT DOCUMENTS

| CN | 101702212 A | 5/2010 |

OTHER PUBLICATIONS

Sun et al, Data Flow Modeling and Verification in Business Process Management, Proceedings of the Americas Conference on Information Systems, New York, New York, Aug. 2004, 4064-4073 (Year: 2004).*

*Primary Examiner* — Andre D Boyce
(74) *Attorney, Agent, or Firm* — Leason Ellis LLP

(57) ABSTRACT

Coordination and management of workflows in parallel among a plurality of approval applications executing on machines within an enterprise network by receiving, at a central location, workflows from an initiating application, determining a set of approvals for each respective workflow and respective approval routes, performing an initial distribution of the respective workflows from the central location by propagating the workflows across their respective approval routes to respective members of the set of approval applications, applying at respective approval applications a set of approval rules to the workflow to determine a workflow's approval status as either approved or rejected, returning the workflow's approval status to the initiating application via the central location, and performing one or more follow-up distributions of workflows from the central location until either all approval applications indicate a status of approved or a number of follow-up distributions reaches a pre-defined maximum number of follow-up distributions.

18 Claims, 7 Drawing Sheets

(56) References Cited

U.S. PATENT DOCUMENTS

| | | | |
|---|---|---|---|
| 8,151,208 B2 | 4/2012 | Sogge et al. | |
| 8,332,253 B1* | 12/2012 | Farmer | G06Q 10/0633 |
| | | | 705/7.27 |
| 8,725,548 B2 | 5/2014 | Leitch et al. | |
| 8,763,006 B2 | 6/2014 | Bobak et al. | |
| 2009/0300064 A1* | 12/2009 | Dertinger | G06F 40/10 |
| 2010/0223557 A1* | 9/2010 | Kenney | G06Q 10/10 |
| | | | 707/E17.014 |
| 2013/0290066 A1* | 10/2013 | Altamirano | G06Q 10/0633 |
| | | | 705/7.27 |
| 2013/0311559 A1* | 11/2013 | Swinson | G06Q 50/01 |
| | | | 709/204 |
| 2014/0337071 A1* | 11/2014 | Stiffler | G06F 3/04847 |
| | | | 705/7.13 |
| 2016/0162819 A1* | 6/2016 | Hakman | G06Q 10/0633 |
| 2019/0286462 A1* | 9/2019 | Bodnick | G06F 9/453 |
| 2020/0202273 A1* | 6/2020 | Lehmann | G06Q 10/06316 |
| 2021/0065119 A1* | 3/2021 | Magazine | G06Q 10/103 |
| 2021/0117557 A1* | 4/2021 | Al-Shanqity | G06F 21/6218 |
| 2021/0192515 A1* | 6/2021 | Lee | G06Q 20/401 |
| 2021/0192535 A1* | 6/2021 | Lee | G06Q 20/389 |

\* cited by examiner

METHOD AND SYSTEM FOR MANAGING APPROVAL WORKFLOW PROCESSES IN A NETWORK SYSTEM

FIELD OF THE DISCLOSURE

The present disclosure relates to a system, method and computer program for coordinating and autonomous management of approval workflow processes in a network system, including triggering, creating, updating, canceling or checking of approval workflow processes in a network system.

BACKGROUND OF THE DISCLOSURE

Software developers are increasingly being asked to provide information technology (IT) workflow management platforms that can handle large numbers of complex processes in user environments such as enterprise network systems. The IT workflow management platforms are frequently customized to specific user environments, industries, fields, businesses, or departments, requiring the assistance and guidance of subject matter experts (SMEs) to build, implement and maintain approval workflow processes. These platforms have proven to be prohibitively expensive and time-consuming to create, develop, implement or maintain.

There exists a great unmet need for a technological solution that can coordinate and manage approval workflow processes in a network system in an inexpensive, efficient and easy to use manner.

SUMMARY OF THE DISCLOSURE

The disclosure provides a technological solution for coordinating and managing workflow processes in parallel among a plurality of approval applications executing on machines within an enterprise network. The technological solution can include a system, method or computer program for coordinating and managing the workflow processes in in parallel in the enterprise network.

According to an aspect of the disclosure, the technological solution includes a method that comprises: receiving, at a central location, one or more workflows from at least one initiating application, each workflow including a work object that requires approval through a set of approval applications executing within the enterprise in order to proceed; determining a set of approvals for each respective workflow; determining an approval route for each approval in the set of approvals from the initiating application to the set of approval applications; performing an initial distribution of the respective workflows from the central location by propagating the workflows across their respective approval routes to respective members of the set of approval applications; applying at respective approval applications a set of approval rules to the workflow to determine a workflow's approval status as either approved or rejected; returning the workflow's approval status to the initiating application via the central location; performing one or more follow-up distributions of workflows from the central location until either all approval applications indicate a status of approved or the number of follow-up distributions reaches a pre-defined maximum number of follow-up distributions. The method can further comprise one or more approval layers, wherein an initiating application of a workflow can specify a first set of approval applications from which the workflow must obtain all approvals before proceeding to a subsequent approval layer, and wherein one or more rejections at any approval layer will cause the workflow to be automatically recalled from all remaining approval applications of the approval layer with status reported to the initiating application The pre-defined maximum number of follow-up distributions can be pre-determined according to prevailing enterprise policies. The pre-defined maximum number of follow-up distributions can also be selected by an individual practitioner of an instance of the method.

A follow-up distribution of previously rejected workflows can include workflows that have been modified to increase the likelihood of approvals.

A rejection of a workflow by one approval application can be sufficient to cause the workflow to be automatically recalled from all remaining members of the set of approval applications with approval status among the respective approval applications reported to the initiating application.

The method of determining the approval route of a workflow can be modified dynamically in response to changes to the set of approval applications.

Additional workflows can be added to a stream of workflows dynamically and processed by respective sets of approval applications by the recited method.

An initiating application can dynamically add or remove approval applications from the set of approval applications determined at the time of workflow initiation.

A maximum number of approval layers can be pre-determined according to prevailing enterprise policies. The maximum number of approval layers can be selected by an individual practitioner of an instance of the method.

According to a further aspect of the disclosure, the technological solution includes a system for coordinating and managing workflow processes in parallel among a plurality of approval applications executing on machines within an enterprise network. The systems comprises a computer network comprising at least one processor, at least one memory, and at least one storage medium; at least one initiating application capable of generating a workflow, each workflow including a work object that requires approval through a set of approval applications executing within the enterprise in order to proceed; and at least one approval interface configured to determine the workflow's approval status as either approved or rejected by respective approval applications among the plurality of approval applications. The system can be configured to: determine a set of approvals for each respective workflow; determine an approval route for each approval in the set of approvals from the initiating application to the set of approval applications; perform an initial distribution of the respective workflows by propagating the workflows across their respective approval routes to respective members of the set of approval applications; receive approval status of each respective workflow from each of the respective approval applications; transmit approval status of each respective workflow to each of the respective initiating applications; perform one or more follow-up distributions of workflows until either all approval applications indicate a status of approved or the number of follow-up distributions reaches a pre-defined maximum number of follow-up distributions.

The system can comprise a trigger interface generated programmatically by the system and configured to: receive workflow data and configuration information from an initiating application; trigger approval workflows by first determining the approval applications from which each workflow will require an approval; determine the approval route by which each workflow propagates from the respective initiating applications to all approval applications from which approval is required for the workflow to proceed; perform an initial distribution of the workflow by propagating the workflow across the respective approval routes to the required approval applications.

The system can comprise a modify interface generated programmatically by the system and configured to: receive new or modified workflow data and configuration information from an initiating application; trigger new approval workflows by first determining the approval applications from which each new workflow will require an approval; determine the approval route by which each new workflow propagates from the respective initiating applications to all approval applications from which approval is required for the new workflow to proceed; perform a follow-up distribution of the new workflow by propagating the new workflow across the respective approval routes to the required approval applications.

The system can comprise a recall interface generated programmatically by the system and configured to: receive workflow cancellation requests from the respective initiating applications; transmit cancellation requests along the respective approval routes to either cancel a workflow approval request in transit to the respective approval applications, or to cancel and recall any pending workflows that are being processed by an approval application; receive workflow cancellation status information from canceled workflows.

The system can comprise a status interface generated programmatically by the system and configured to transmit upon request of a respective initiating application the status of a workflow, comprising information as to a workflow's status as: in transit, in process, approved, rejected, or canceled.

The system can comprise a monitoring chart interface generated programmatically by the system and configured to generate a flowchart of the respective workflows in progress, wherein the position of each workflow is shown along its respective approval route.

The system can comprise a workflow callback interface generated programmatically by the system and configured to receive status information of respective workflows from the approval applications.

The system can comprise a completion callback interface generated programmatically by the system and configured to: transmit status information of respective workflows from the workflow callback interface back to the initiating applications; determine the approval rate of the respective workflows and, for workflows whose approval rate is less than 100%, query the initiating application as to whether it will supply a new or modified workflow to be launched by the modify interface.

The system can comprise one or more approval layers, wherein an initiating application of a workflow can specify a first set of approval applications from which the workflow must obtain all approvals before proceeding to a subsequent approval layer, and wherein one or more rejections at any approval layer will cause the workflow to be automatically recalled from all remaining approval applications of the approval layer with status reported to the initiating application In the system, the pre-defined maximum number of follow-up distributions can be pre-encoded in the system.

In the system, the pre-defined maximum number of follow-up distributions can be selected by a user.

In the system, a follow-up distribution of previously rejected workflows can include workflows that have been modified to increase the likelihood of approvals.

In the system, a rejection of a workflow by one approval application can be sufficient to cause the workflow to be automatically recalled from all remaining members of the set of approval applications with approval status among the respective approval applications reported to the initiating application.

In the system, the determination of the approval route of a workflow can be modified dynamically in response to changes to the set of approval applications.

In the system, additional workflows can be added to a stream of workflows dynamically and processed by respective sets of approval applications.

In the system, an initiating application can dynamically add or remove approval applications from the set of approval applications determined at the time of workflow initiation.

A maximum number of approval layers can be pre-encoded in the system. The maximum number of approval layers can be selected by a user.

According to a further aspect of the disclosure, the technological solution includes a computer readable medium that contains a computer program which, when executed by one or more computing devices, coordinates and manages workflows in parallel among a plurality of approval applications executing on machines within an enterprise network, including: receiving, at a central location, one or more workflows from at least one initiating application, each workflow including a work object that requires approval through a set of approval applications executing within the enterprise in order to proceed; determining a set of approvals for each respective workflow; determining an approval route for each approval in the set of approvals from the initiating application to the set of approval applications; performing an initial distribution of the respective workflows from the central location by propagating the workflows across their respective approval routes to respective members of the set of approval applications; applying at respective approval applications a set of approval rules to the workflow to determine a workflow's approval status as either approved or rejected; returning the workflow's approval status to the initiating application via the central location; performing one or more follow-up distributions of workflows from the central location until either all approval applications indicate a status of approved or the number of follow-up distributions reaches a pre-defined maximum number of follow-up distributions. The computer program, when executed, can cause inclusion of one or more approval layers, wherein an initiating application of a workflow can specify a first set of approval applications from which the workflow must obtain all approvals before proceeding to a subsequent approval layer, and wherein one or more rejections at any approval layer will cause the workflow to be automatically recalled from all remaining approval applications of the approval layer with status reported to the initiating application Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
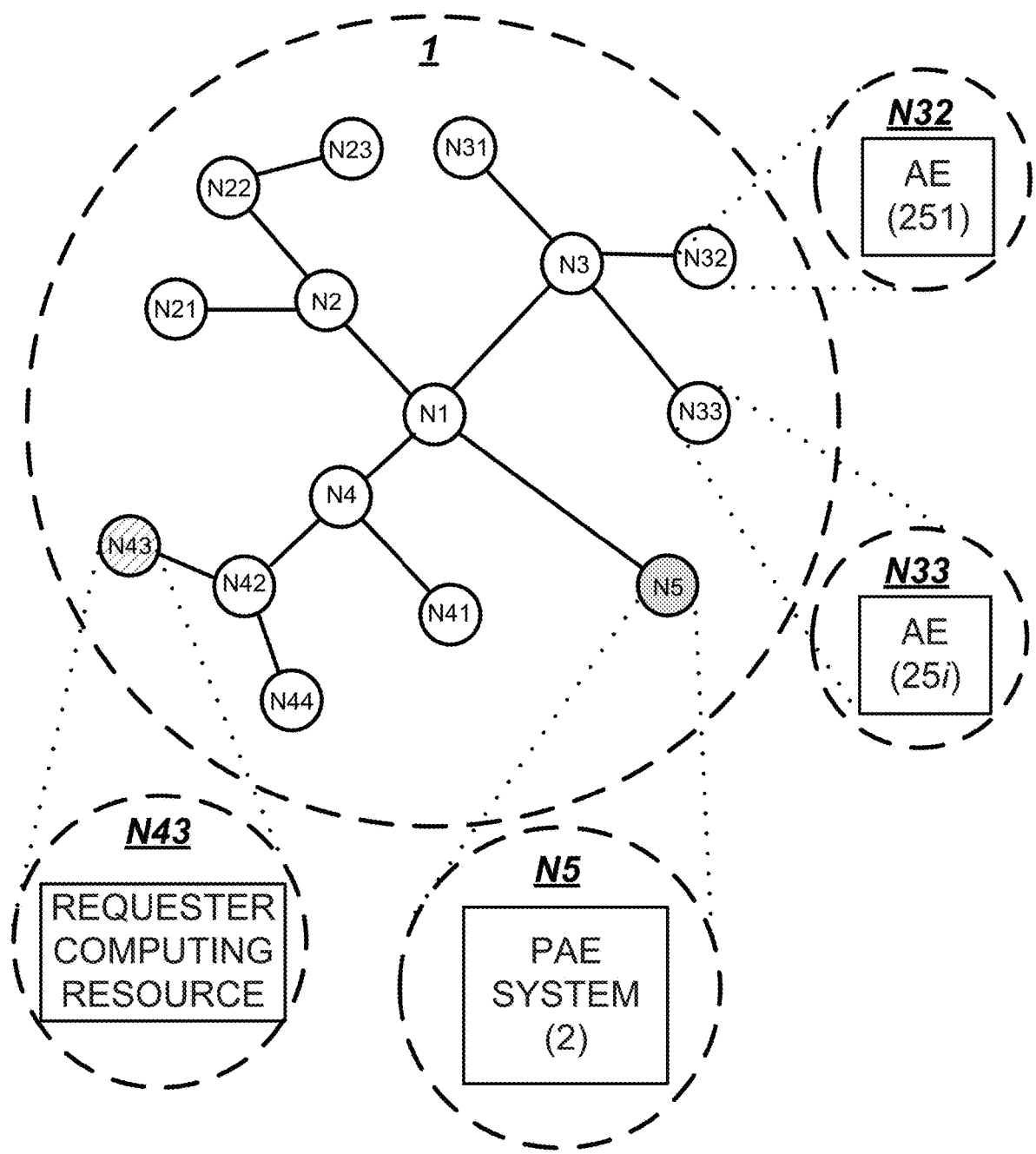
FIG. 1 shows an example of an enterprise network that is provided with the technological solution according to the principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as to not unnecessarily obscure the embodiments of the disclosure. The examples used are intended merely to facilitate an understanding of ways in which the disclosure may be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

By way of overview and introduction, the present disclosure provides a technological solution that can coordinate and manage simultaneously a plurality of work object requests and associated approval workflow processes in parallel among a plurality of approval engines (AEs) executing at nodes within an enterprise network. The technological solution can provide many significant and important advantages and benefits to an enterprise network, including, for example, but not limited to carrying out dynamic parallel approval processes without any access or visibility to business logic of the approval engines that utilize it. This allows the technological solution to serve many approval engines as the approval engines take care of the business logic and pass the data and configuration information needed to the technological solution to manage the dynamic parallel approval workflow processes.

The technological solution can utilize connectors to the approval engines without itself needing access to any business logic or enterprise-specific information. If an approval engine is used within an enterprise network to handle review and approval work object requests, then a connector can be created to allow the technological solution to utilize that approval engine. This can ensure that the technological solution does not need to implement enterprise-specific business logic, such as for example, organization hierarchy, human resources data, or handling absences of one or more reviewers.

FIG. 1 shows an example of an enterprise network 1 that is provided with the technological solution according to the principles of the disclosure, including a parallel approval engine (PAE) system 2. The enterprise network 1 can include a private computer network, a private enterprise computer network, a corporate computer network, a campus computer network, a military computer network, a government computer network, or any other network application that could benefit from the technological solution. The network 1 can include hundreds, thousands, millions or more nodes N. Any one or more of the nodes N in the network 1 can include a computing resource that can be connected to an external network (not shown), such as, for example, the Internet, or a communicating device (not shown) that is located internally or externally to the network 1. Each node N can include a location identification, such as, for example, an Internet Protocol (IP) address, an email address, a network address, a MAC address, or other unique identifier for the node, such that data packets can be transmitted to and received from the node. The network 1 can include a firewall (not shown). The network 1 includes the PAE system 2, which can be included at one or more nodes N in the network 1, such as, for example, node N5. The network 1 can include one or more approval engines (AEs) 25I, 25i, each of which can be located at a unique node or combined into an approval engine suite (e.g., approval engine 250, shown in FIG. 5), where i is a positive integer greater than 1.

The network 1 can include a backbone network that interconnects various computing resources and nodes. The network 1 can include one or more communicating devices (not shown), one or more servers (not shown), one or more databases (not shown), and any other communicating device typically included in an enterprise network, all of which can be interconnected by communication links and all of which can be located behind a firewall (not shown). The network 1 can include one or more switching and distribution layers (not shown). The switching and distribution layers (not shown) can include one or more layers of switching devices (not shown) or router devices that connect the nodes in the network 1, including, for example, computing resources, communicating devices (not shown), servers (not shown) and database(s) (not shown). The router devices (not shown) can be connected in the network 1 by one or more communication links. The router devices (not shown) can include a firewall (not shown). The switching devices (not shown) can be connected to nodes N by one or more communication links. The switching devices (not shown) can include ethernet switches.

The technological solution can include the PAE system 2, which can, as noted above, be located at one or more nodes in or external to the network 1. The PAE system 2 can include a parallel approval engine (PAE) processor, such as, for example, the PAE processor 260 shown in FIG. 5 (discussed below), which can be configured to receive, at a central location, one or more work object requests or approval workflow processes from a requester computing resource located at a node N43, or at least one approval engine 251, 25i, or a suite of approval engines 250 (shown in FIG. 5), and determine, at a central location, respective one or more approval workflow processes for the work object request(s). Each work object request can include the work object that requires approval through one or more approval engines (AE) 251, 25i executing on one or more nodes within the network 1 in order to proceed.

Each AE 251, 25i can include a reviewer interface (not shown) comprising a graphic user interface (GUI) that can be presented at a communicating device (not shown) at a node N in the network 1 to allow a reviewing user to review and implement a decision with respect to each of one or more work object requests received from one or more source nodes, such as, for example, the requester computing resource located at node N43. The reviewer can be any network user, including, for example, an owner, a security analyst, a reviewer, a member, an approver, an area manager, a decision maker, a supervisor, a department head, an administrator, a site administrator, a stakeholder, or any network user tasked with reviewing a work object request and deciding on a course of action with respect to the work object request. The reviewer interface (not shown) can process one or more work object requests received from one or more source nodes N and apply a decision rendered by the reviewer by means of the reviewer interface for a given work object request, allowing the reviewer to, for example, approve, reject, modify, annotate, implement or take some other action with regard to the work object request.

The PAE system 2, by virtue of program code executing in or being implemented by a processor associated therewith, can determine the approval workflow process, including a set of approvals, for each respective work object request, determine an approval route for each approval in the set of approvals from the initiating application to the set of approval applications, and perform an initial distribution of the respective work object request according to the determined approval workflow process from the central location by propagating the work object request across their respective approval routes to respective member nodes of the set of approval applications. The PAE system 2 can be configured to apply at respective approval engines 251, 25i (or, e.g., any application engine in the suite of application engines 250, shown in FIG. 5) a set of approval rules to the approval workflow process to determine a workflow process's approval status as either approved or rejected. The PAE system 2 can be configured to return the workflow process' approval status to the initiating application via the central location, such as, for example, the requester computing resource located at node N43.

The PAE system 2 can be configured, again, by code executing in a processor, to perform one or more follow-up distributions of approval workflow processes from the central location until either all approval applications (or computing resources at reviewer nodes) indicate a status of approved or the number of follow-up distributions reaches a pre-defined maximum number of follow-up distributions.

The PAE system 2 can facilitate many approval workflow processes in an enterprise that requires approval from multiple organizations. Running approval workflow processes in parallel saves a tremendous amount of time and effort compared to sequential approval workflow processes. The PAE system 2 coordinates and manages execution of a plurality of approval workflow processes in parallel, linking multiple approval workflow processes together by virtue of suitable code executing in the processor associated therewith.

As seen in FIG. 1, the network 1 can include a plurality of nodes N1, N2, N21, N22, N23, N3, N31, N32, N33, N4, N41, N42, N43, N44, and N5 (collectively or individually referred to as a node "N"). The PAE system 2 can communicate with any one or more of the nodes N in the network 1, and can receive (or transmit) data packets from (or to) any of the nodes N. The data packets can include a header portion and a payload portion. The header portion can include routing information, including, for example, destination node location identification and source node location identification. The payload can include data and instructions.

The PAE system 2 can be connected to computing resources (such as, for example, enterprise applications) in the network 1 to implement code in order to prioritize, sequence, schedule, manage and monitor work object requests and approval workflow processes of all manner of work objects, including, for example, computing jobs, access to restricted areas of the network 1, requests for new equipment, or any other work object request that might require one or more layers of approval in the enterprise. The PAE system 2 can include one or more web-based interfaces, such as, for example, in the PAE processor 260 (shown in FIG. 5) to provide control over, and, if necessary, command override capabilities over the PAE system 2 and its feed to all computing resources, including client applications or approval engines. The PAE system 2 can, without human intervention, be configured by code to handle approvals of computer-enabled workflow processes across all functions within enterprise network 1.

For instance, the PAE system 2 can include a trigger unit (e.g., trigger unit 261, shown in FIG. 5) that allows a computing resource such as the requester computing resource at node N43 to initiate a work object request to the PAE system 2 (or the approval engine 251 or 25i). The PAE system 2 can be configured to receive data and configuration information and, upon receipt of this initiating information, initiate a triggering event for an approval workflow process that results in the sequencing of approvals for the associated work object request. If new or different approvals are to be added to an approval workflow process after an initial work object request is received, the PAE system 2 can include a modifier unit (e.g., modifier unit 262, shown in FIG. 5) that can receive additional data and configuration information to be added to the associated approval workflow process.

At times there can be reason to cancel previously entered work object requests and, resultantly, the associated approval workflow processes. The PAE system 2 can include a recaller unit (e.g., recaller unit 263, shown in FIG. 5) which configures the processor associated with the PAE system to accommodate an initiating computing resource such as the requester computing at node N43 (or the approval engine 251, shown in FIG. 1) to cancel a pending work object request, whereby the PAE system 2 can recall any or all pending work object requests upon receiving a recall request from the initiating computing resource (or approval engine).

The PAE system 2 can monitor and make available status information to the initiating computing resource (or approval engine) via a monitor unit (e.g., monitor unit 264, shown in FIG. 5), whereby the initiating computing resource (e.g., requester computing resource at node N43 or approval engine 251) can receive the status of a work object request from the PAE system 2, as well as the status of the associated approval workflow process.

The PAE system 2 can be configured (here, as always, by code executing in the processor) to generate and provide a full range of telemetry documenting its operations. According to one non-limiting example, the monitor unit (e.g., monitor unit 264, shown in FIG. 5) in the PAE system 2 can generate a monitoring chart that includes a flowchart or other GUI image showing the status of all pending work object requests and associated approval workflow processes. The PAE system 2 can transmit data packets to, for example, the requester computing resource located at node N43 and operated by the network user who initiated the work object request, or to an approval engine (e.g., AE 251, shown in FIG. 1) or another computing resource in the network 1. The data packets can be parsed by, for example, the requester computing resource into data and instruction signals to generate and display a graphic user interface (GUI) on a display device (not shown) at the node N43, which can include a display of the flowchart or other GUI image.

The PAE system 2 can include an interactive workflow callback unit (e.g., workflow callback unit 265, shown in FIG. 5) that can provide the PAE system 2 with a notification when an approval workflow process has been completed. This input to the PAE system 2 can be used to determine whether other approval workflow processes need to be triggered or if all approval workflow processes are complete.

The PAE system 2 can include a completion callback unit (e.g., completion callback unit 266, shown in FIG. 5) that can be configured to provide the results of completed approval workflow requests to all initiating computing resources in the network 1.

The technological solution can provide additional significant and important advantages and benefits to the enterprise network 1 when used with one or more approval engines, including, for example, but not limited to: a centrally located PAE system 2 that can cater to systems, applications and products, including, for example, SAP and non-SAP automated processes; accelerated request order resolution implementations; handling all reviewer determinations during approval workflow processes; handling financial and non-financial approval processes; providing timely and relevant notifications, such as, emails indicating arrival, escalation, reminders, and status updates for each work object request; maintaining data integrity and audit history; providing for dynamic reviewer determination with other enterprise systems (such as, for example, human-resources systems), which can include referring to network user lookup tables related to organizational hierarchies and positions and implementing the retrieved information to appropriately route work object requests to appropriate nodes and associated network users; systematic interpretation and implementation of workflow approval policies; ensuring segregation of duties (SoD); reducing or eliminating training requirements for requesters or reviewers; and eliminating any need for SMEs to maintain the workflow approval technology.

Figure 2:
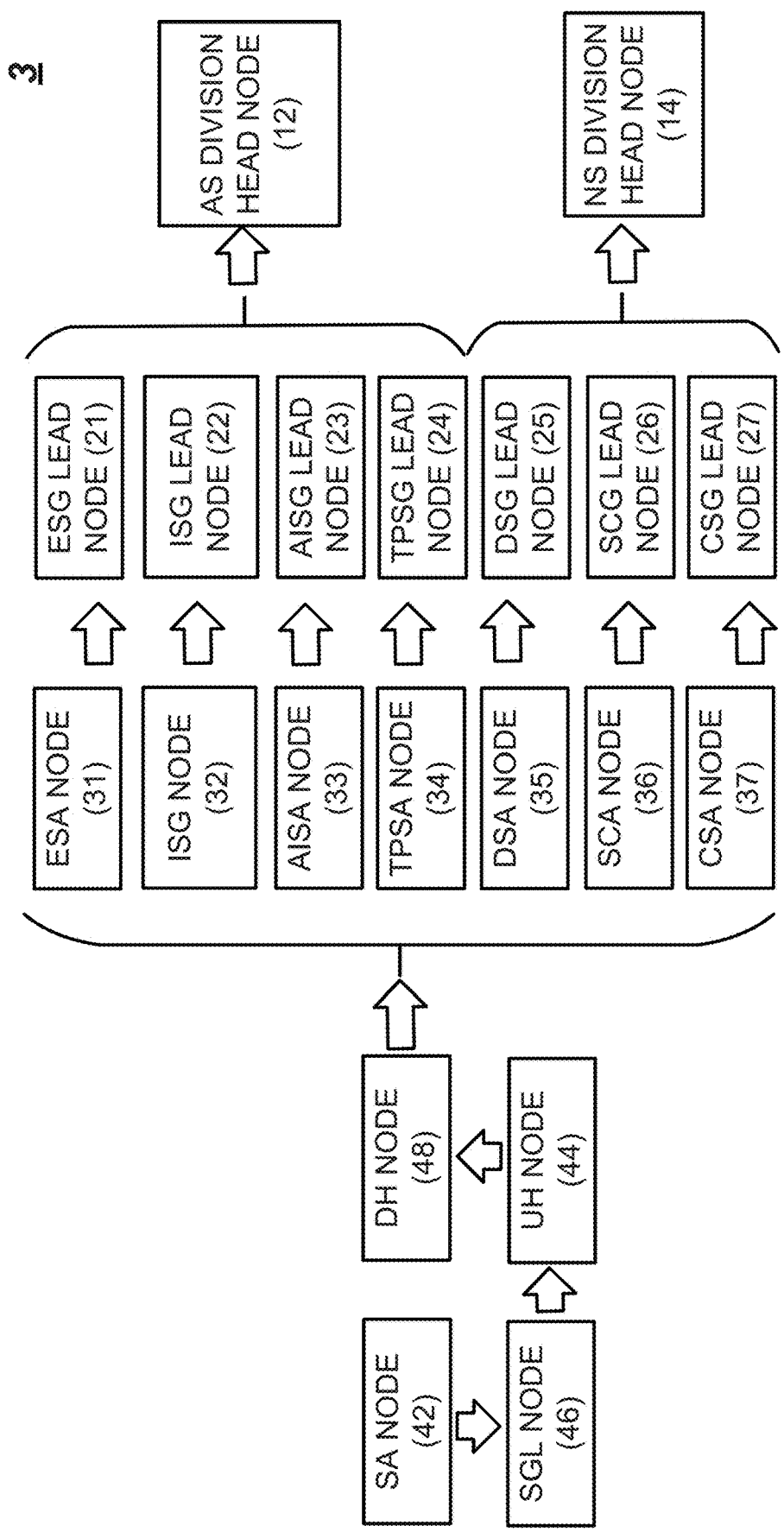
FIG. 2 shows an example of an approval workflow process for a work object request.

FIG. 2 shows a non-limiting example of an approval workflow process 3 for a work object request, such as, for example, a work object request initiated on the requester computing resource located at node N43 (shown in FIG. 1) by an enterprise employee for access to a restricted portion of the network 1. In this example, the work object request can be received from the node N43 at a computing resource located at a security analyst (SA) node N42 (Step 42) or at the PAE system 2 at, for example, node N5. An approval workflow process can be created (for example, by or in coordination with the approval engine (AE) 251, shown in FIG. 1) for the work object request to fit any enterprise process (or business process) according to determined policies or rules, without any specialized integrated development or design tools. The approval workflow process can be created based on enterprises polices or rules relating to the position, access or authorization rights or privileges, organizational structure, business rules, business needs, or any other rules or policies relating to the enterprise or network user for whom the work object request was generated. A routing table can be generated for the approval workflow process, including each node as a hop through which the work object request must pass with approval in order for the work object request to be approved and the approval workflow process to be completed.

The work object request can be forwarded from the requester computing resource at node N43 (shown in FIG. 1) or from the SA node (Step 42) to the next node hop in the routing table, routing the work object request to a computing resource operated by a security group lead (SGL) located at a node (not shown) in the network (Step 46), where the work object request can be approved or denied. If approved, the work object request can be forwarded from the computing resource at the SGL node (Step 46) to the next node hop in the routing table—that is, a computing resource operated by the requester's group lead (UH) at another node (not shown) in the network (Step 44), otherwise the work object request can be sent back to the requester computing resource at node N43 (shown in FIG. 1).

If the work object request is approved at the computing resource at the UH node (Step 44) by the requester's group lead, then the work object request can be forwarded to the next node hop in the routing table—that is, a computing resource operated by the requester's division head (DH) at another node (not shown) in the network (Step 48), otherwise the work object request can be sent back to the requester computing resource at node N43 (shown in FIG. 1).

If the work object request is approved at the computing resource at the DH node (Step 48), then the work object request can be forwarded in parallel to computing resources located at a plurality of respective nodes (Step 31 to Step 37), otherwise the work object request can be sent back to the requester computing resource at node N43 (shown in FIG. 1). In this example, the work object request can be forwarded simultaneously to nodes comprising computing resources operated by an extranet security analyst (ESA) (Step 31), an intranet security analyst (ISA) (Step 32), an application integration security analyst (AISA) (Step 33), a third-party security analyst (TBSA) (Step 34), a device security analyst (DSA) (Step 35), a security configuration analyst (SCA) (Step 36), and a cloud security analyst (CSA) (Step 37). Depending on the policies and rules for the approval workflow process, the work object request might have to be approved by the computing resources at all of the nodes in Steps 31 through 37 for the approval workflow process to progress, otherwise the work object request can be denied and sent back to the requester computing resource at node N43 (shown in FIG. 1).

In this non-limiting example, after the work object request is approved at each of the nodes in Steps 31 to 37, the work object request can be forwarded to the next node hops in the routing table, including, for example, the computing resources located at each of the nodes in the routing table for Step 21 to Step 27, respectively. The nodes in Steps 21 to 27 can include, respectively, computing resources operated by an extranet security group lead (ESGL) (Step 21), an intranet security group lead (ISGL) (Step 22), an application integration security group lead (AISGL) (Step 23), a third-party security group lead (TPSGL) (Step 24), a device security group lead (DSGL) (Step 25), a security configuration group lead (SCGL) (Step 26), and a cloud security group lead (CSGL) (Step 27). In this example, the policies and rules may require that the approval workflow process for the work object request progress through each of the nodes in Steps 31 to 37 and Steps 21 to 27 and be approved at all of the nodes for the approval workflow process to progress, otherwise the work object request can be denied and sent back to the requester computing resource at node N43 (shown in FIG. 1).

The routing table can be configured so that the next node hop from each of the nodes in Steps 21 through 24 is a node comprising a computing resource operated by an application security (AS) division head (Step 12), and the next node hop from each of the nodes in Steps 25 through 27 is a node comprising a computing resource operated by a network security (NS) division head (Step 14). If the work object request is approved at both nodes in Steps 12 and 14, then the work object request can be approved and the associated approval workflow process completed, otherwise the work object request can be denied and sent back to the requester computing resource at node N43 (shown in FIG. 1).

Figure 3:
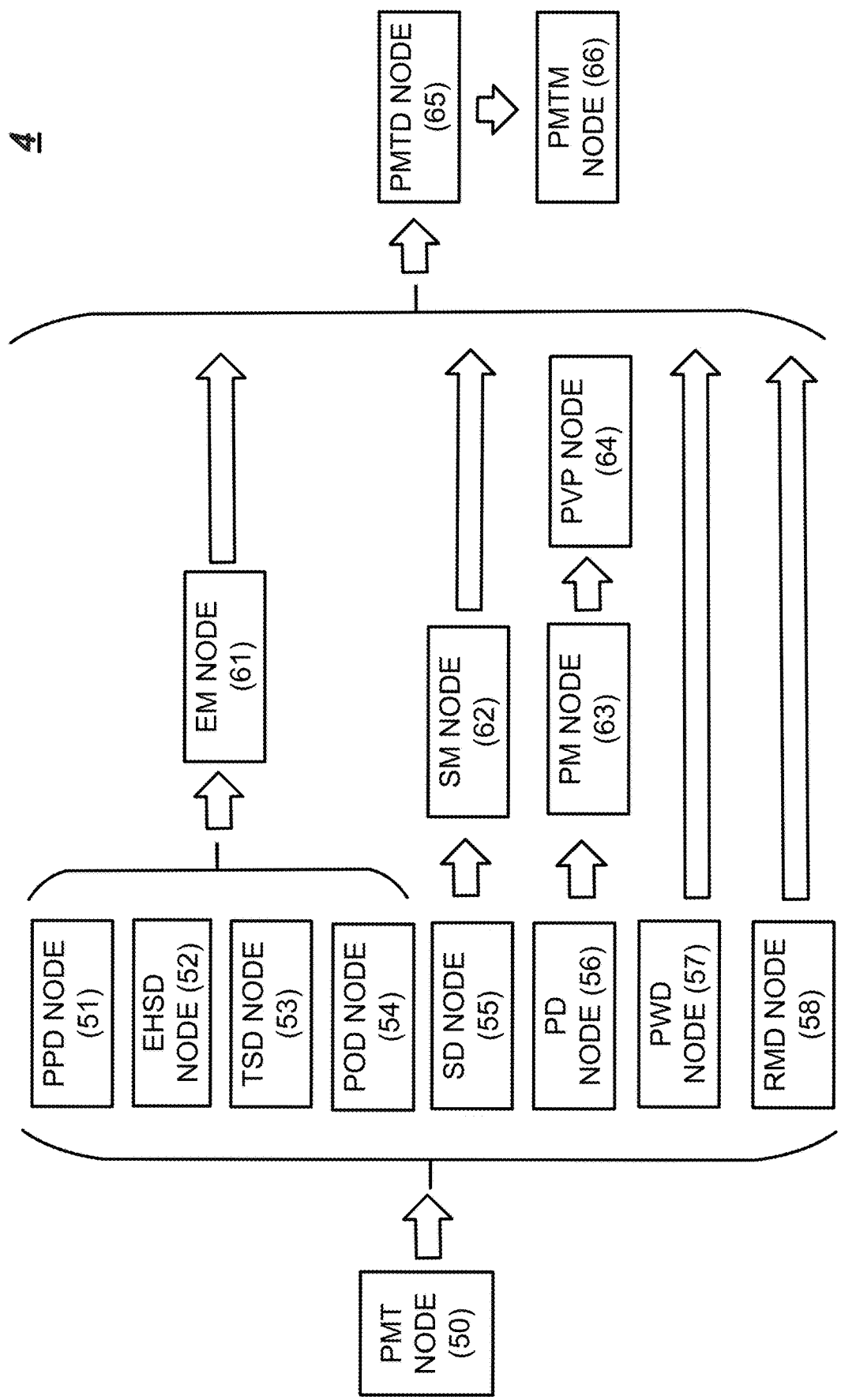
FIG. 3 shows another non-limiting example of an approval workflow process for a work object request.

FIG. 3 shows a non-limiting example of an approval workflow process 4 for a work object request, such as, for example, a new project proposal for the enterprise network 1 (shown in FIG. 1). Similar to the example in FIG. 2, the work object request can be initiated by the requester computing resource located at node N43 (shown in FIG. 1). The work object request can be received from the node N43 at a node comprising a computing resource operated by a project management team department employee (PMT) (Step 50), or at node N32 comprising the AE 251, or at the PAE system 2 at node N5. An approval workflow process can be created (for example, by or in coordination with the AE 251 at node N32, shown in FIG. 1) for the work object request to fit any enterprise process (or business process) without any specialized integrated development or design tools. The approval workflow process can be created based on enterprises polices or rules relating to the position, access or authorization rights or privileges, organizational structure, business rules, business needs, or any other rules or policies relating to the enterprise or network user for whom the work object request was generated. A routing table can be generated for the approval workflow process, including each node as a hop through which the work object request must pass with approval in order for the work object request to be approved and the approval workflow process to be completed.

An approval workflow process routing table can be created for the work object request according to the approval workflow process 4, including each node as a hop through which the work object request must pass with approval in order for the work object request to be approved and the approval workflow process 4 to be completed. The work object request can be initiated at and forwarded from or initiated at the requester computing resource (shown in FIG. 1) and forward to the computing resource at the PMT node (Step 50). The work object request is forwarded from the PMT node (Step 50) in parallel to the next node hops in the routing table, routing the work object request simultaneously to nodes comprising computing resources operated by each of the entities in Steps 51 through 58, including a production planning department (PPD) (Step 51), an environment, health and safety department (EHSD) (Step 52), a technical service department (TSD) (Step 53), a process optimization department (POD) (Step 54), an security department (SD) (Step 55), a proponent department (PD) (Step 56), a power department (PWD) (Step 57), and a risk management department (RMD) (Step 58), where the work object request can be approved or denied by any one or more of the reviewers. Depending on the rules set for the approval workflow process, the work object request might have to be approved at all of the nodes in Steps 51 to 58 for the approval workflow process 4 to progress, otherwise the workflow request can be sent back to the requester computing resource at node N43 (shown in FIG. 1).

In this non-limiting example, after the work object request is approved at each of the nodes in Steps 51 to 54, the work object request can be forwarded to the next node hop in the routing table—that is, a node (not shown) comprising a computing resource operated by an engineering manager (EM) (Step 61). After the work object request is approved at the SD node (Step 55) and PM node (Step 63), the work object request can be forwarded to the next respective node hops in the routing table, which in this example are nodes (not shown) comprising computing resources operated by a security manager (SM) (Step 62) and a proponent manager (PM) (Step 63), respectively. After being approved at the PM node (Step 63), the work object request can be forwarded to a node (not shown) comprising a computing resource operated by a proponent vice president (PVP) (Step 64).

After the work object request is approved at each of the nodes in Steps 61, 62, 64, 57 and 58, the work object request can be forwarded to the next node hop in the routing table, which in this example is a node (not shown) comprising a computing resource operated by a project management team department (PMTD) (Step 65). If the work object request is approved at the PMTD node (Step 65), then the work object request can be forwarded to the next node hop in the routing table, a node (not shown) comprising a computing resource operated by a project management team manager (PMTM) (Step 66) for final approval.

Figure 4:
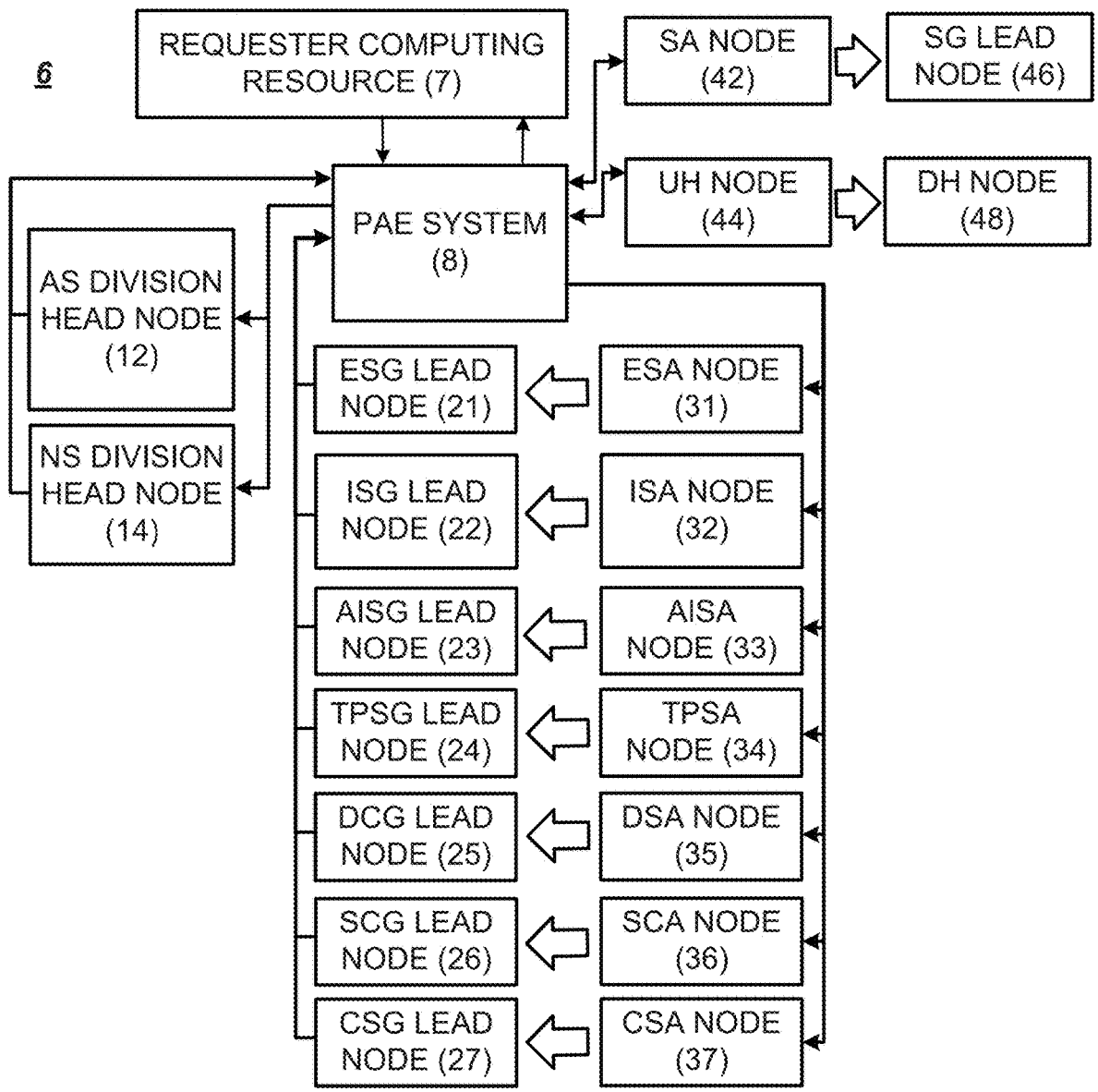
FIG. 4 shows an example of an implementation process of the approval workflow process shown in FIG. 2 with the PAE system of FIG. 1.

FIG. 4 shows a non-limiting example of an implementation process 6 of the approval workflow process 3 (shown in FIG. 2) with the PAE system 2 (shown in FIG. 1), according to the principles of the disclosure. The implementation process 6 can include a security checklist approval workflow process initiated at the requester computing resource located at node N43 (shown in FIG. 1), which can be initiated at the instruction of the network user requesting a work object (Step 110), such as, for example, user access to a restricted database (not shown). The work object request can include a data package comprising multiple data packets that can be transmitted between two or more nodes across communication links in the network 1 (shown in FIG. 1). The work object request can comprise a header portion, a data portion, an approval node portion, an attachment portion, and an action portion. The work object request can be generated and displayed in an HTML, PDF, XML, or any other readily available format.

The header portion can include, for example, a source node identification (e.g., an IP address, an email address, a network address, a media access control (MAC) address, or other unique identifier), a requester identification, a requester name, a title, and/or a creation date and timestamp. The requester identification can include, for example, an employee number, a social security number, a link to a database record, or any other identifier that can accurately identify the network user who initiated the work object request.

The data portion can include data that pertains to the work object request. The data portion can include a title, a description of the work object request, or a notation related to the work object request, including any remarks or comments by the requester—that is, the network user who initiated the work object request.

The approval node portion can include one or more destination nodes (including, for example, an IP address, an email address, a network address, a MAC address, or other unique identifier for the destination node), a request reviewer identification, a request reviewer's name, or any other identification that can be referenced to accurately identify the reviewer of the work object request or the reviewer's node. The approval node portion can include one or more tags that can be checked to determine whether a particular destination node is to receive notices (e.g., periodic updates) related to the work object request. A destination node can be provided by the source node (e.g., entered into the computing resource at the requester node N43, shown in FIG. 1) or based on the source node (e.g., automatically provided based on the identity of the request reviewer or source node, such as, for example, a supervisor or network administrator).

The attachment portion can include a tag field (e.g., a TRUE/FALSE tag field), a record, a file, a link, a hyperlink, a pointer, or any other attachment or link to an attachment. For instance, if the tag field is "TRUE," then the attachment portion includes one or more attachments associated with the work object request.

The action portion can include one or more actions that are to be carried out with respect to the work object request. The actions can include, for example, approve, reject, review, pending, failed, recalled, comment, implement, or any other actions applicable to the type of work object request. One or more of these actions can be performed automatically, such as under control of a program executing so as to suitably configure a processor to, for instance, automatically recall a workflow from all remaining members of a set of approval applications.

The PAE system 2 can be configured to integrate with computing resources, such as, for example, the requester computing resource, approval engines, and enterprise applications in the network 1 (shown in FIG. 1), and efficiently and effectively resolve work object requests received from one or more nodes in the network 1. The PAE system 2 can (e.g., in coordination with one or more approval engines) generate an approval workflow process route and build a routing table that includes all nodes through which the approval workflow process must progress, including transmitting a process result such as, for example, an approval, a denial, a request for additional information, an abandonment, a cancellation, a status update or any other information relating to a work object request or its associated approval workflow process to one or more nodes in the network 1 (shown in FIG. 1).

The PAE system 2 can, for example, in coordination with one or more approval engines determine and create a dynamic approval route for each received work object request and continuously (or periodically) reevaluate the nodes and actions in the approval workflow process based on applicable rules and policies. The PAE system 2 can, for example, in coordination with one or more approval engines implement approval workflow processes, approval workflow process schemas, or approval workflow process scenarios determined based on one or more policies or rules. The PAE system 2 can be configurable, for example, in coordination with one or more approval engines to ensure that an appropriate approval route is determined and maintained for each work object request based on the relevant parameters set forth in the policies and rules, whereby the approval workflow process for each work object request is routed in the network 1 according to the applicable route, including forwarding the work object request to the appropriate node(s), for example, as shown in FIG. 4.

Referring to FIGS. 1 and 4, a request for approval of a work object can be received from the requester computing resource located at node N43 (Step 7). The work object request can be received at the PAE system 2 (Step 8). The PAE system 2 can include the approval engine 251 (shown in FIGS. 1 and 5) or a suite of approval engines 250 (shown in FIG. 5). In the example shown in FIG. 4, the requester computing resource at node N43 (shown in FIG. 1) can include a computing resource located at a checklist system node, and in an example scenario where the work object request is approved at each hop in the routing table for the approval workflow process 6, including all twenty-two transactions shown in FIG. 4, the work object request can be approved and a notification sent to the computing resource at the checklist system node. The PAE system 2 can coordinate and manage the approval workflow process 6 in parallel. Each of the nodes shown in FIG. 4 are described above, including the computing resources located at each of the nodes.

For instance, as seen in FIG. 4, the PAE system 2 can simultaneously forward or cause to be forwarded the work object request to each of the ESA node (Step 31), ISA node (Step 32), AISA node (Step 33), TPSA node (Step 34), DSA node (Step 35), SCA node (Step 36), and CSA node (Step 37). At the same (or a different) time, the PAE system 2 can forward or cause to be forwarded the work object request to the AS division head node (Step 12) and NS division head node (Step 14). At the same (or a different time), the PAE system 2 can forward or cause to be forwarded the work object request to the SA node (Step 42) and UH node (Step 44).

After approval of the work object request at the nodes in Steps 31 to 37, the work object request can be progressed to the next hops in the routing table, the nodes in Steps 21 to 27, respectively, after which the PAE system can determine the status of the approval workflow process at each hop in the routing table.

After approval of the work object request at the nodes in Steps 42 and 44, the work object request can be progressed to the next hops in the routing table, the nodes in Steps 46 and 48, respectively.

Figure 5:
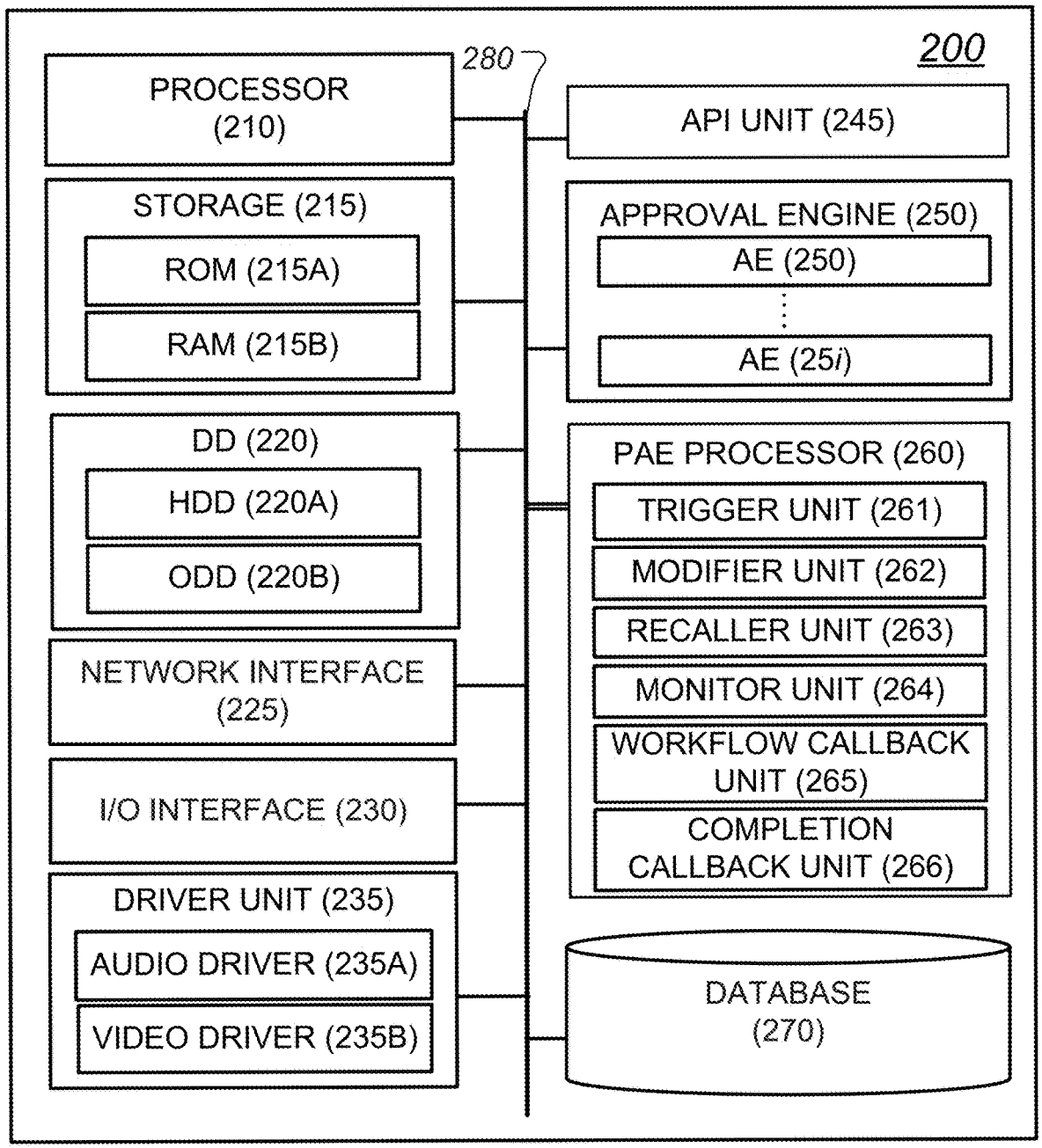
FIG. 5 shows an embodiment of a parallel approval engine (PAE) server, according to the principles of the disclosure.

FIG. 5 shows a non-limiting embodiment of a parallel approval engine (PAE) server 200 that can be included in the PAE system 2 (shown in FIG. 1), according to the principles of the disclosure. The PAE server 200 can be configured to implement the various aspects of the disclosure. The PAE server 200 can include a processor 210, a storage 215, a disk drive (DD) 220, a network interface 225, an input/output (I/O) interface 230, a driver unit 235, an application program interface (API) unit 240, a suite of approval engines 250, a parallel approval engine (PAE) processor 260, a database 270 and a backbone 280. As noted above, the approval engines in the suite of approval engines 250 can be located elsewhere in the network, external to the PAE server 200, for example, at one or more other nodes in the network 1 (shown in FIG. 1).

The PAE processor 260 can include a trigger unit 261, a modifier unit 262, a recaller unit 263, a monitor unit 264, a workflow callback unit 265, and a completion callback unit 266. Any one or more of the components 261 to 266 can include a separate computing device or can be included in a computing device as a module.

The backbone 280 can be communicatively linked to each of the components 210 to 270 in the PAE server 200 by a communication link.

Any one or more of the components 215 to 270 can include a device or a module that is separate from the processor 210, as seen in FIG. 5, or integrated or integratable in a device(s) such as the processor 210. The PAE server 200 can include a sound generation device (not shown), such as, for example, a speaker, or a display device such as, for example, a liquid crystal display or a light emitting diode (LED) display device (not shown).

The PAE server 200 includes a computer-readable medium that can hold executable or interpretable computer code (or instructions) that, when executed by the processor 210 or PAE processor 260, causes the steps, processes and methods described herein to be carried out. The computer-readable medium can be provided in the storage 215 or DD 220, or elsewhere in the PAE server 200 or network 1 (shown in FIG. 1). The computer readable medium can include sections of computer code that, when executed by, for example, the processor 210, API unit 240, suite of approval engines 250, or PAE processor 260, cause the PAE server 200 to carry out the process 2 (shown in FIG. 2), process 3 (shown in FIG. 3), process 6 (shown in FIG. 4), process 100 (100A and 100B shown in FIGS. 6A and 6B, respectively), or other processes described or contemplated by this disclosure.

The backbone 280 can include any of several types of bus structures that can further interconnect to a memory bus (with or without a memory controller), a peripheral bus, and a local bus using any of a variety of commercially available bus architectures. The backbone 270 can include a system bus.

The processor 210 can include any of various commercially available graphic processing unit devices. Dual microprocessors and other multi-processor architectures can be included in the processor 210. The processor 210 can include a central processing unit (CPU) or a graphic processing unit (GPU). The processor 210 includes a computing device.

The storage 215 can include a read only memory (ROM) 215A and a random-access memory (RAM) 215B. A basic input/output system (BIOS) can be stored in the non-volatile memory 215A, which can include, for example, a ROM, an EPROM, or an EEPROM. The BIOS can contain the basic routines that help to transfer information between components in the PAE server 200, such as during start-up. The RAM 215B can include a high-speed RAM such as static RAM for caching data.

The DD 220 can include a hard disk drive (HDD) 220A and an optical disk drive (ODD) 220B. The HDD 220A can include, for example, an enhanced integrated drive electronics (EIDE) drive, a serial advanced technology attachments (SATA) drive, or the like; and, the ODD 220B can include, for example, a read/write from/to a CD-ROM disk (not shown), or, read from or write to other high capacity optical media such as a digital versatile disc (DVD). The HDD 220A can be configured for external use in a suitable chassis (not shown). The DD 220 can be connected to the backbone 270 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The storage 215 or DD 220, including computer-readable media, can provide nonvolatile storage of data, data structures, and computer-executable instructions. The storage 215 or DD 220 can accommodate the storage of any data in a suitable digital format. The storage 215 or DD 220 can include one or more apps that can be used to execute aspects of the architecture described or contemplated in this disclosure.

One or more program modules can be stored in the storage 215 or DD 220, including an operating system (not shown), one or more application programs (not shown), one or more application program interfaces (APIs), other program modules (not shown), and program data (not shown). Any (or all) of the operating system, application programs, program modules, and program data can be cached in the RAM 215B as executable sections of computer code.

The network interface 225 can be connected to the network 1 (shown in FIG. 1). The network interface 225 can include a wired or a wireless communication network interface (not shown) or modem (not shown). The network interface 225 can receive and transmit data and instruction signals between the processor 210 and one or more nodes N in the network 1. When used in a local area network (LAN), the PAE server 200 can be connected to the LAN network through the wired or wireless communication network interface; and, when used in a wide area network (WAN), the PAE server 200 can be connected to the WAN network through the modem. The modem (not shown) can be internal or external and wired or wireless. The modem can be connected to the backbone 270 via, for example, a serial port interface (not shown).

The (I/O) interface 230 can receive commands and data from an operator. The I/O interface 230 can be communicatively coupled to one or more input/output devices (not shown), including, for example, a keyboard (not shown), a mouse (not shown), a pointer (not shown), a microphone (not shown), a speaker (not shown), or a display (not shown). The received commands and data can be forwarded to the processor 210 from the I/O interface 230 as instruction and data signals via the backbone 280 to any component in the PAE server 200.

The driver unit 235 can include an audio driver 235A and a video driver 235B. The audio driver 235A can include a sound card, a sound driver (not shown), an interactive voice response (IVR) unit, or any other device necessary to render a sound signal on a sound production device (not shown), such as for example, a speaker (not shown). The video driver 235B can include a video card (not shown), a graphics driver (not shown), a video adaptor (not shown), or any other device necessary to render an image signal on a display device (not shown).

The API unit 240 can include one or more application program interfaces (APIs). The APIs can include, for example, web APIs, simple object access protocol (SOAP) APIs, remote procedure call (RPC) APIs, representation state transfer (REST) APIs, or other utilities and services APIs.

The suite of approval engines 250 can include one more devices or one or more modules that are separate from the processor 21 or PAE processor 250, as seen in FIG. 5, or integrated with the processor 210 or PAE processor 250. The suite of approval engines 250 can include a plurality of approval engines 251 to 25$i$, where i is a positive integer greater than 1. Each approval engine 251 to 25$i$ can be configured to reference and use enterprise-specific information, such as, for example, business logic, personnel data, information technology infrastructure, and enterprise policies and rules, to generate approval workflow processes, including approval workflow routing tables, for each work object request initiated in the network 1 (shown in FIG. 1).

The PAE processor 260 can include one or more devices or one or more modules that are separate from the processor 210, as seen in FIG. 5, or integrated with the processor 210. The PAE processor 260 can include one or more computing resources, computing devices or communicating devices, including web service interfaces to trigger, update, cancel, modify, monitor, check status or report aspects of work object requests and associated approval workflow processes, including their statuses. The PAE processor 260 can be connected to the backbone 280 and configured to receive at one or more inputs (not shown) and transmit at one or more outputs data and instruction signals. The PAE processor 260 can include one or more modules that can be configured to handle, or to work in conjunction with the suite of approval engines 250 to handle work object requests, approval workflow process configurations (including, e.g., workflow routing tables), rules, policies, approval workflow process monitoring and updating, workflow callbacks, completion callbacks, work object recalls, triggering of computing resources, and application exits. The PAE processor 260 alone or in conjunction with the suite of approval engines 250 can facilitate creation, management, modification, monitoring, and provisioning of work object requests and associated approval workflow processes during which data, documents, files, records, or other information, data or tasks are passed from one node to another node in the network 1 (shown in FIG. 1) for action according to one or more approval workflow processes.

The database 270 can include a database management system (DBMS) (not shown), file-based storage system or any storage medium which can receive and process queries in the PAE server 200 to locate and retrieve data from the database 270. The database 270 can include a DBMS such as, for example, SQL, MySQL, Oracle, Access, or Unix. The database 270 can include a relational database. The database 270 can include the computing resource base and communicating device base for the entire network 1 (shown in FIG. 1), including all communicating devices or computing resources in the network 1. The database 270 can store the IP addresses of all computing resources or communicating devices in the network 1.

The database 270 can include a plurality of databases, including, for example, a member-agent (MA) database (not shown), a workflow approval policies (RP) database (not shown), a workflow approval scenarios (RS) database (not shown), an approval workflow processes (SP) database (not shown), a node determination rules (NDR) database (not shown), or a workflow approval routes (RR) database (not shown). Each of the databases can be implemented as regions in a single database 270 or a distributed database (not shown) in the network 1. The database 270 can include large numbers of computing resources that are accessible to the computing and communicating devices in the network 1.

The MA database can store and manage directory service information, including, for example, information about users, systems, networks, services, and applications throughout the network 1. The MA database can store and provide an organized set of records, including records with a hierarchical structure, such as, for example, an enterprise email directory, an enterprise phone directory, an enterprise computer resource directory, an enterprise client device directory, an enterprise computing resource directory, IP addresses, and MAC addresses. The MA database can be implemented with, for example, a lightweight directory access protocol (LDAP) for accessing and maintaining distributed directory information services over, for example, an Internet Protocol (IP) network—in which case, one or more of the approval engines in the approval engine suite 250 can include or connect to an LDAP server (not shown) that includes a directory system agent (DSA), which can operate on, for example, port 389 or 636 (for LDAP over SSL).

The RP database can store and manage one or more workflow approval policies and associated data. The workflow approval policies and associated data can be provided and accessed by one or more of the approval engines in the approval engine suite 250. The workflow approval policies can be retrieved from the RP database at the request of the approval engine. The workflow approval policies can include rules for creating, modifying, configuring or implementing an approval workflow process, including, for example, settings for each individual step in the workflow approval process, settings for steps that can lead to conditional routing in the approval workflow process, links with auto-creation of approval workflow processes for the work object request, work object approval policies (e.g., whether delegation of authority is permissible), or any policies or configurations that can be implemented to derive resolution scenarios. The workflow approval policies can include governance rules or governance business rules that can be applied to dynamically evaluate or reevaluate approval steps or to run through one or more node determination rules against a workflow approval route. The workflow approval policies and associated data can include, for example, business process policy and configuration rules that can be employed by the approval engine in creating, configuring, modifying, monitoring, reporting or implementing the approval workflow process route.

The RS database can store and manage one or more workflow approval scenarios and associated data that are created, configured, modified, updated, monitored, reported or implemented by the approval engine. The RS database can store and manage workflow schemas associated with each one or more of the workflow approval scenarios in the database.

The SP database can store and manage one or more approval workflow processes and associated data that are created, configured, modified, updated, monitored, reported or implemented by the approval engine. The approval workflow processes and associated data can include, for example, one or more workflow approval schemas and one or more steps for handling work object requests in an approval workflow process. The workflow approval schemas can include, for example, business workflow schemas. The handling steps can include, for example, approval steps associated with business objects. The SP database can store and manage one or more approval workflow processes that are created or configured by a process described in this disclosure. The stored approval workflow processes can include one or more templates, including one or more associated workflow approval schemas, that can be applied in rendering a graphic user interface on a display device at a node.

The NDR database can store and manage one or more node determination rules and associated data that are created, configured, modified, monitored, updated, reported or implemented by the approval engine. The node determination rules can include, for example, rules that can be applied by the approval engine in evaluating a workflow approval scenario or creating, configuring, modifying, monitoring, reporting or implementing a workflow approval route for a work object request.

The RR database can store and manage one or more workflow approval routes and associated data that are created, configured, modified, updated, monitored, reported or implemented by the approval engine. The RR database can include a record associated with each unique resolution route, including, for example, the header portion, data portion, approval node portion, attachment portion, and action portion of each workflow approval route. The RR database can store and manage history data for each workflow approval route, from creation of the work object request to completion of the approval workflow process. The RR database can store and populate, for example, the work object fields, including a node identification field (e.g., source node "SourceNodeID" and destination nodes "DestNode01" to "DestNodeM," where M is a positive integer greater than 0), a user ID field (e.g., a network user identification "UserID" or reviewer identifications "ReviewerID01" to "ReviewerIDM"), a user name field (e.g., a user's name or user name "UserName" and an a reviewer's name or user name "ReviewerName01" to "ReviewerNameM"), a date/time stamp field (e.g., date/time the work object request is created at the source node "RequestDate," or accessed/actioned by a destination node), a work object title field (e.g., title for work object requested by the source node, "SourceTitle"), a note field (e.g., a notation by the source node, "SourceNote" or destination node), an action field (e.g., an action to be carried out with respect to the work object request, including for example, review, approve, deny, abandon, cancel, modify, update or report), and an attachment field (e.g., a field that indicates whether one or more attachments are associated with the work object request, and, if so, a copy of or a link to the attachment).

The workflow approval routes and associated data in the RR database can be updated continuously or periodically, in real-time, thereby ensuring provisioning of a current, complete and optimal workflow approval route for each work object request in the network 1 (shown in FIG. 1), including handling of specific work object requests associated with, but not limited to, enterprise systems such as sourcing, engineering, manufacturing, manufacturing definitions, production, control, quality control, product configurations, personnel, accounting, sales, billing, marketing, or project management.

Any of the approval engines in the approval engine suite 250 can be configured to interact with, for example, a human resources information system (HRIS) or human resources management system (HRMS) (not shown), or similar platform in the network 1 (shown in FIG. 1) and access and retrieve workflow schemas, business policies, business rules, business scenarios, governance business rules, organizational structures, escalation procedures, delegation procedures, user information, or workflow reviewer information.

The approval engine(s) 251 to 25i, alone or in communication with the PAE processor 260, can create, configure, define, modify, update, monitor, implement or report approval workflow processes, workflow approval scenarios or workflow approval schemas. The approval engine(s) can set up or facilitate the setting up of controls such as, for example, escalation procedures, whether an approval workflow process permits delegation of authority and other controls. The PAE processor 260 can, for example, in coordination with one or more of the approval engines 250, generate or communicate with a computing resource at a node to generate, a GUI that displays a work object request, the status of the work object request, an approval workflow process, or the status of the approval workflow process.

The PAE processor 260 can, for example, in coordination with one or more of the approval engines 250, generate or communicate with a computing resource at a node to generate a GUI such as, for example, a console (not shown) that can link to a plurality of predetermined business processes and business applications, which can be stored locally in the PAE server 200, such as, for example, in the database 270. The GUI can include expandable folders that allow for easy identification and selection of workflow approval processes or computing resources.

The PAE processor 260 can, for example, in coordination with one or more of the approval engines 250, generate or communicate with a computing resource at a node to generate a GUI such as, for example, a console (not shown) that includes an example of a workflow approval scenario. The GUI can include a plurality of workflow approval scenarios which can be selected and implemented by the PAE processor 260 or one of the approval engines 250 or the computing resource at the node, which can be operated by a network user tasked with reviewing and approving/denying the work object request.

The approval engine 251, alone or in communication with the PAE processor 260, can create, configure, define, modify, update, monitor, report or implement, or can work in cooperation with a computing resource at a node in the network 1 (shown in FIG. 1) to create, configure, define, modify, update, monitor, report or implement a workflow approval scenario. The workflow approval scenario can be referenced when generating a workflow approval routing table for a work object request.

The approval engine 251, alone or in communication with the PAE processor 260, can create, configure, define, modify, update, monitor, report or implement, or can work in cooperation with a computing resource at a node in the network 1 (shown in FIG. 1) to create, configure, define, modify, update, monitor, report or implement a workflow approval route for each work object request that is received from a source node, such as, for example, the requester computing resource at node N43 (shown in FIG. 1). The generated workflow approval route can include a complete list of nodes and routes through which the work object request is to travel in the network 1 (shown in FIG. 1). The workflow approval route can include a routing table (e.g., a look-up-table) that defines a pathway for the work object request in the network 1, including all nodes in the pathway, as well as the approval steps or the sequencing through which the work object request is to be transmitted along the identified routes in the network 1, and the tasks to be performed by each node along the pathway.

The workflow approval route for each work object request can be stored locally in the PAE server 200, for example, in the database 270. The workflow approval route can be generated by the approval engine 251 by accessing a workflow approval policy in the RP database (not shown) and a workflow approval scenario in the RS database (not shown) and evaluating the workflow approval scenario based on the workflow approval policy. One or more node determination rules can be referenced in the NDR database (not shown) to generate, configure, define, modify, update, report or implement the workflow approval route, for example, in accordance with an associated workflow approval scenario, thereby providing a workflow approval route the can include a complete and current list of all nodes, the routes to be travelled, and the sequence of travel between each identified node.

The PAE processor 260 or approval engine(s) 250 can include a runtime environment (or RTE) that can iterate through the approval workflow process and associated workflow approval route until, for example, the final step in the approval workflow process is completed. The PAE processor 260 or approval engine(s) 250 can include, for example, a finite state machine that can iterate through each state in the workflow approval route, including evaluating each state in the workflow approval route and determining how to transition from one state (or node) to another, and the action necessary to effectuate each transition. The PAE processor 260 or approval engine(s) 250 can create, configure, modify, update, monitor, report or implement an activity that can be carried out a given state.

Each state can represent a node in the workflow approval route. Each state can be a position in the workflow approval route that a given work object request can be in at any given moment. The transition can be a pathway between two or more states that shows how a work object request can travel between the states (or nodes). The transition can include a current state and a next state, or a current state and a previous state. The action can include, for example, a work object request signal (or action signal) received from a destination node (e.g., from a computing resource operated by a reviewing and approving authority) that represents an approval of an action request (e.g., where the received action signal indicates that the work object request should move to the next state), a denial (e.g., where the received action signal indicates the work object request should move to the previous state or be sent back to the source node, e.g., node N43, shown in FIG. 1), abandonment (e.g., where the received action signal indicates the work object request should move to an abandoned or canceled state), re-initiation (e.g., where the received action signal indicates that the work object request should be sent back to the start state), completion (e.g., where the received action signal indicates that the work object request should be forwarded to the completed state). The activity can include one or more actions that are to be carried out at a given state after a work object request enters that state. The activity can include, for example, a note action (e.g., a notation that is to be added to a note field), a notification action (e.g., an email is to be sent to the source node N43 or a destination node), an destination node edit action (e.g., one or more destination nodes in the resolution route that are to be added, deleted, or modified). Once a work object request has been resolved and the associated approval workflow process completed, a notification can be generated and sent with the final result to the source node or one or more destination nodes N in the network 1 (shown in FIG. 1).

The approval engine(s) 260 can access reviewer data in the MA database (not shown), request policy data in the RP database (not shown), workflow approval scenario data in the RS database (not shown), approval workflow process data in the SP database (not shown), node determination rules data in the NDR database (not shown) or workflow approval route data in the RR database (not shown), which can include direct assignment data, workflow approval rule data, and delegation data related to the work object request. The workflow approval rule data can include one or more rules related to a particular function, position, role, job, or task in the enterprise. Based on the accessed data and rules, enterprise financial authorities can be defined with corresponding thresholds. Since the network 1 can change frequently due to such factors as, for example, addition or removal of network users, corporate restructuring, or changing business environment, the information generated can be checked periodically to review the current level of authority for each destination node to determine if the destination node's level of authority is still appropriate given the current structure or state of operations in the network 1, and whether the authority assignment is in line with any enterprise limitations (e.g., not exceeded), and whether proper controls are in place. Additionally, personal delegations for each destination node can be reviewed periodically (or continuously) and modified (e.g., extended, voided, or modified) as appropriate to ensure that the appropriate destination node is tasked with the approval limit based on the relevant financial threshold as described in the workflow approval policies.

The trigger unit 261 can, as noted above, include a computing device or it can be included in a computing device as a module. The trigger unit 261 can receive a request for creation of a work object request from the computing resource at the requester node N43 (shown in FIG. 1). The received request can include work object data, including data and configuration information, that can be used to create the work object request and trigger needed approval workflows in the network 1 (shown in FIG. 1). The trigger unit 261 can generate, or it can send a request to the approval engine(s) 250 to generate an approval workflow process for the work object request, including a workflow approval route table that includes a pathway to each node required for completion of the approval workflow process. The trigger unit 261 can initiate implementation of the approval workflow process.

The modifier unit 262 can receive a modification request for an existing work object request from the computing resource at the requester node N43 (shown in FIG. 1). The received modification request can include data and configuration information that can be used to modify the approval workflow process for the existing work object request, including the workflow approval routes, including addition, deletion or modification of nodes in the workflow approval route table. The modifier unit 262 can modify, or it can send a request to the approval engine(s) 250 to modify the work object request or approval workflow process, including workflow approval routes.

The recaller unit 263 can receive a cancellation request for an existing work object request from the computing resource at the requester node N43 (shown in FIG. 1). The received cancellation request can include identifying information for the existing work object request and an instruction to cancel the work object request and recall any pending approval workflows in the approval workflow process. After cancelling the identified work object request, the recaller unit 263 can trigger cancellation and recall of all pending approval workflows in the network 1 (shown in FIG. 1). The recaller unit 263 can send a request to the approval engine(s) 250 to cancel and recall all (or a subset of all) approval workflows.

The monitor unit 264 can monitor and periodically (or continuously) update the status of each existing work object request and associated approval workflow process in real-time or near real-time. In response to a status request from the computing resource at the requester node N43 (shown in FIG. 1), the monitor unit 264 can generate data and instructions to render and populate a GUI on a display device (not shown) at the requester node N43, so as to display the status of a particular work object request or associated approval workflow process identified in the original status request received form the requester node N43. For instance, the monitor unit 264 can generate or cause the communicating device (not shown) at the node N43 to generate a flowchart that shows the status of the work object request and associated approval workflow process.

The workflow callback unit 265 can receive a callback request from the approval engine(s) 250 when an approval workflow process is completed for a given work object request. The approval engine(s) 250 can determine if any other approval workflow processes need to be initiated or if the approval workflow process has been completed. If the approval engine(s) 250 determines that other approval workflow processes need to be carried out, the approval engine(s) 250 can initiate the other approval workflow processes.

The completion callback unit 266 can receive a completion status signal from the approval engine(s) 250 and, in response to the signal, it can generate a completion signal for a given work object request and associated approval workflow process. The completion callback unit 266 can send the completion signal to the computing resource at the requester node N43 (shown in FIG. 1). The completion signal can include a summary of the results of the approval workflow process, including the final decision or outcome of the work object request.

The PAE processor 260 can be configured to carry out dynamic parallel approval processes without any access or visibility to business logic of the computing resources that utilize it. This allows the PAE processor 260 to serve many computing resources as the integrating computing resources take care of the business logic and pass the data and configuration information needed to the PAE processor 260 to manage the dynamic parallel approval workflows.

The PAE processor 260 can utilize connectors to the approval engine(s) 250, as discussed above, or additional approval engines (not shown) without itself needing to access any business or enterprise-specific information. If a computing resource is used within an organization to handle work object approval, then a connector can be created to allow the PAE processor 260 to utilize that computing resource. This can ensure the that PAE processor 260 does not need to implement organization-specific business logic, such as for example, organization hierarchy, human resources data, or handling absence of approvers.

Figure 6A:
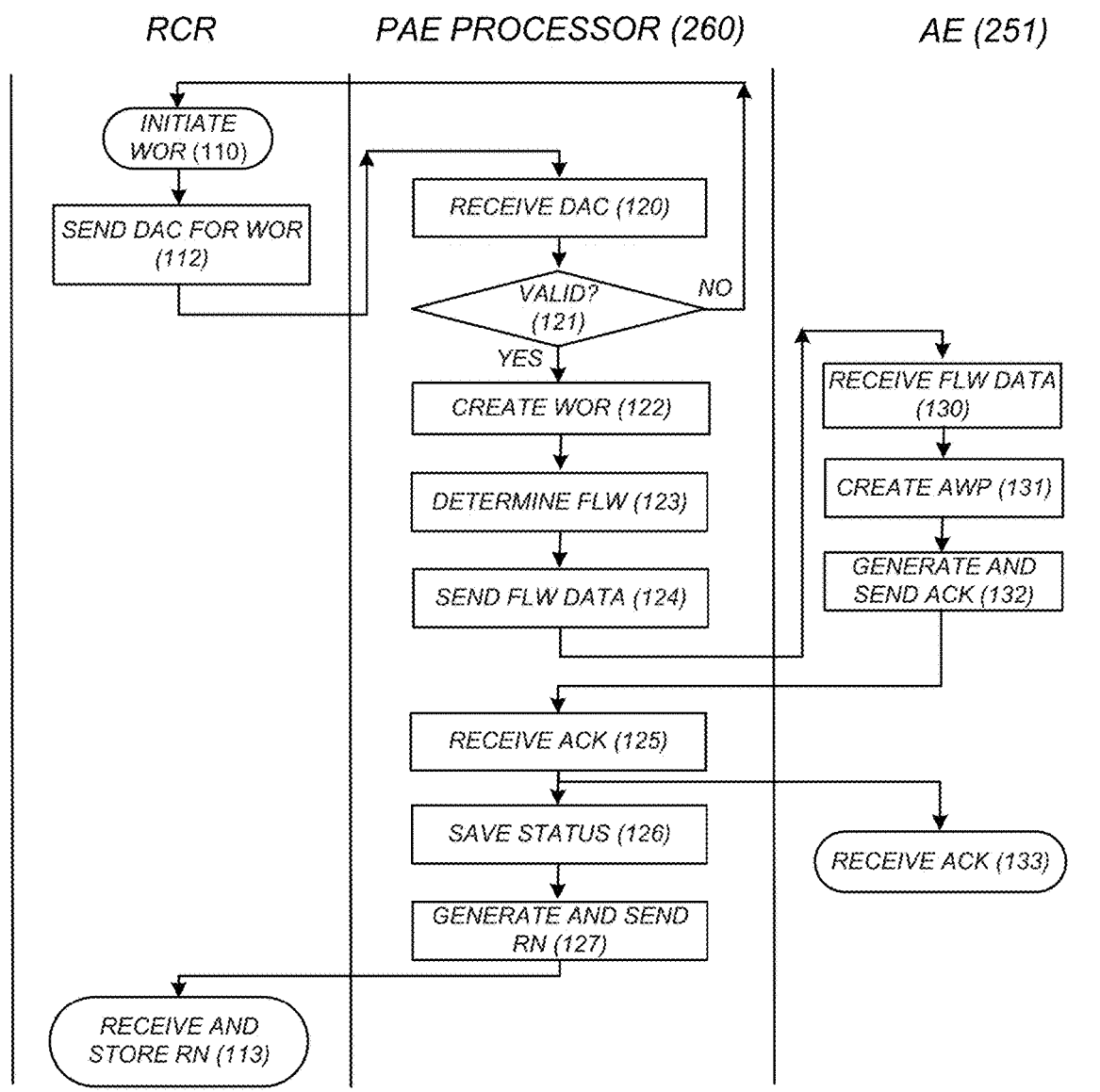
FIG. 6A shows a non-limiting embodiment of a parallel approval process according to the principles of the disclosure.
Figure 6B:
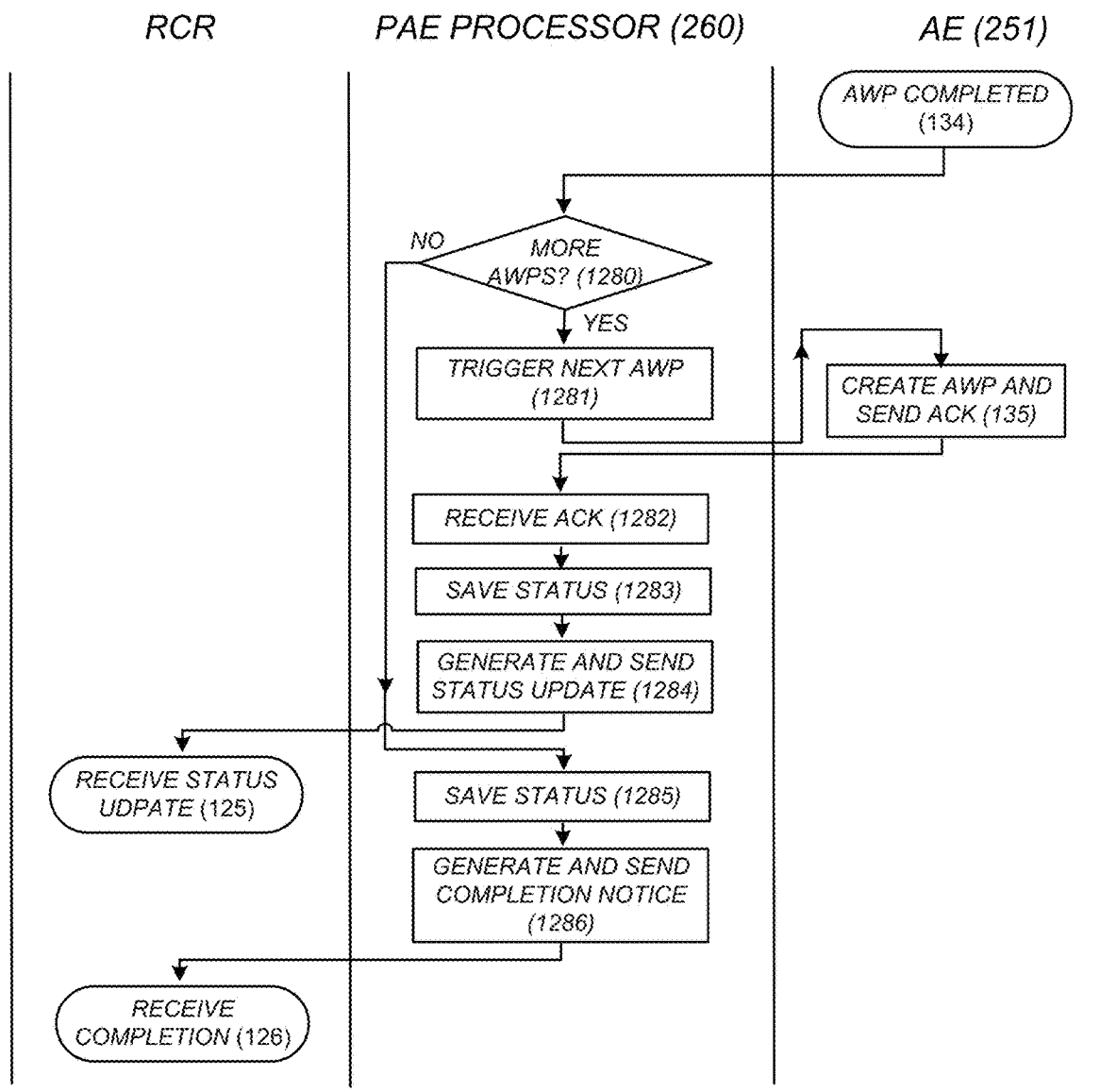
FIG. 6B also shows a non-limiting embodiment of a parallel approval process according to the principles of the disclosure.

FIGS. 6A and 6B show a non-limiting embodiment of a parallel approval process 100 (100A and 100B) according to the principles of the disclosure. Referring to FIGS. 1, 6A and 6B, a work order request (WOR) can be initiated at the requester computing resource (RCR) at node N43 (shown in FIG. 1) (Step 110). Data and configuration (DAC) can be generated by the RCR and sent to the PAE processor 260 (Step 112). Upon receiving the DAC for the WOR (Step 120), the PAE processor 260 can determine whether the data or configuration of the WOR is valid (Step 121). If it determines that the received data or configuration of the WOR is invalid (NO at Step 121), then response message can be sent to the RCR, indicating that the DAC are invalid, at which point the RCR can edit the WOR or DAC or initiate a new WOR (Step 110).

If the PAE processor 260 determines the DAC is valid for the WOR (YES at Step 121), then the PAE processor 260 can create a work order request (Step 122) and determine first level approval workflows (FLW) for the WOR (Step 123). The PAE processor 260 can determine additional levels of approval for a work object request or approval workflow process, depending on the application of the disclosure, as will be understood by those skilled in the art. The PAE processor 260 can send the FLW data for the WOR to the approval engine (AE) 251 (Step 124).

After receiving the FLW data (Step 130), the AE 251 can create an associated approval workflow process (AWP) for the WOR (Step 131). Creation of the AWP can also include creation of an approval workflow process routing table that includes all necessary nodes for completion of the WOR as hops in the table. The AE 251 can generate an acknowledgement (ACK) and send the ACK to the PAE processor 260 (Step 132). After receiving the ACK from the AE 251 (Step 125), the PAE processor 260 can save the status information for the WOR or associated AWP (Step 126) and return an acknowledgement signal to the AE 251 (Step 133). The PAE processor 260 can generate and send a request number (RN) for the particular WOR or AWP to the RCR (Step 127), where the RN can be received and stored (Step 113).

Referring to FIG. 6B, upon completion of the AWP, the AE 251 can send an AWP completion notice message to the PAE processor 260 (Step 134). Upon receiving the AWP completion notice message from the AE 251, the PAE processor 260 can determine whether additional APS remain (Step 1280). If it determines that additional AWP(s) exist (YES at Step 1280), then PAE processor 260 can trigger the next AWP (Step 1281), which will trigger the AE 251 to create the next AWP and send an acknowledgement to the PAE processor 260 (Step 135). Upon receiving the acknowledgement from the AE 251 (Step 1282), the PAE processor 260 can save and/or update the status of the WOR and AWP(s) (Step 1283). The PAE processor 260 can generate and send status data for the WOR or AWP(s) to the RCR (Step 1284), where it can be received and stored (Step 125).

If the PAE processor 260 determines that no additional AWPs exist (NO at Step 1280), then status data for the WOR and AWP can be saved (Step 1285) and an WOR/AWP completion message generated and sent to the RCR (Step 1286). The RCR can receive the WOR/AWP completion message (Step 126) and display the status of the WOR/AWP on, for example, a display device (not shown) at the RCR location.

The terms "a," "an," and "the," as used in this disclosure, means "one or more," unless expressly specified otherwise.

The term "backbone," as used in this disclosure, means a transmission medium or infrastructure that interconnects one or more computing resources, computing devices or communicating devices to provide a path that conveys data packets and instruction signals between the one or more computing resources, computing devices or communicating devices. The backbone can include a bus or a network. The backbone can include an ethernet TCP/IP. The backbone can include a distributed backbone, a collapsed backbone, a parallel backbone or a serial backbone.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, or a software defined radio (SDR), without limitation. A communicating device can be portable or stationary. A communicating device can include a computing device.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link, without limitation. The RF communication link can include, for example, WiFi, WiMAX, IEEE 802.11, DECT, 0G, 1G, 2G, 3G, 4G or 5G cellular standards, or Bluetooth, without limitation.

The terms "computer" or "computing device," as used in this disclosure, means any machine, device, circuit, component, or module, or any system of machines, devices, circuits, components, or modules, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, or servers, without limitation.

The term "computing resource," as used in this disclosure, means software, a software application, a web application, a web page, a computer application, a computer program, computer code, machine executable instructions, firmware, or hardware. A computing resource can include an email account, a user account, or a network account. A computing resource can include an approval engine or a work object request approval application.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task or processed to render information.

The term "database," as used in this disclosure, means any combination of software or hardware, including at least one application or at least one computer. The database can include a structured collection of records or data organized according to a database model, such as, for example, but not limited to at least one of a relational model, a hierarchical model, or a network model. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "machine," as used in this disclosure, means a computing device, a communicating device or a computing resource.

The term "member," as used in this disclosure, means a network user (or "reviewer") or a communicating device of a network user identified to review, approve, deny or take action with respect to a work object request.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, or ICMP.

The term "node," as used in this disclosure, means a physical or virtual location that comprises a computing device, a communicating device, or a computing resource. Each node can be associated with a unique network user.

The term "server," as used in this disclosure, means any combination of software or hardware, including at least one application or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation. The server can include a cloud or a server farm.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-based system for coordinating and managing workflows in parallel among a plurality of approval applications executing on machines within an enterprise network, the computer-based system comprising:
   a computer network comprising at least one processor, at least one memory, a display device, and at least one storage medium;
   at least one initiating application capable of generating a workflow, each workflow including a work object that requires approval through a set of approval applications executing within the enterprise network in order to proceed;
   at least one approval interface configured to determine the workflow's approval status as either approved or rejected by respective approval applications among the plurality of approval applications;
   the computer-based system configured to:
      determine a set of approvals for each respective workflow using the at least one processor;
      determine an approval route for each approval in the set of approvals from the initiating application to the set of approval applications using the at least one processor;
      add the approval route for each approval to an approval route table stored within the at least one memory of the computer network using the at least one processor;
      perform an initial distribution of the respective workflows by propagating the workflows across their respective approval routes to respective members of the set of approval applications using the at least one processor;
      receive approval status of each respective workflow from each of the respective approval applications using the at least one processor;
      transmit approval status of each respective workflow to each of the respective initiating applications using the at least one processor;
      cancel at least a subset of rejected workflows in the initial distribution using the at least one processor including a recaller unit;
      monitor the status of each workflow in the initial distribution using the at least one processor including a monitor unit;
      display a graphic user interface (GUI) on the display device using the at least one processor, wherein the GUI externally displays, to a network user, a GUI image showing a status of all pending work object requests and associated approval workflow processes; and
      perform one or more follow-up distributions of workflows, using the at least one processor, by modifying each approval route of a respective workflow in the approval route table using a modifier unit, to differ from each approval route established in the initial distribution for those workflows in which the approval status is rejected by the approval applications in the initial distribution until either all approval applications indicate a status of approved or a number of follow-up distributions reaches a predefined maximum number of follow-up distributions.

2. The computer-based system of claim 1, further comprising a trigger unit configured to:
   receive workflow data and configuration information from an initiating application;
   trigger approval workflows by first determining the approval applications from which each workflow will require an approval;
   determine an approval route by which each workflow propagates from the respective initiating applications to all approval applications from which approval is required for the workflow to proceed;
   perform an initial distribution of the workflow by propagating the workflow across approval routes to the required approval applications.

3. The computer-based system of claim 1, further comprising a modifier unit configured to:
   receive new or modified workflow data and configuration information from an initiating application;
   trigger new approval workflows by first determining approval applications from which each new workflow will require an approval;
   determine an approval route by which each new workflow propagates from the respective initiating applications to all approval applications from which approval is required for the new workflow to proceed;
   perform a follow-up distribution of the new workflow by propagating the new workflow across respective approval routes to the required approval applications.

4. The computer-based system of claim 1, further comprising a recaller unit configured to:
   receive workflow cancellation requests from respective initiating applications;

transmit cancellation requests along respective approval routes to either cancel a workflow approval request in transit to the respective approval applications, or to cancel and recall any pending workflows being processed by an approval application; and receive workflow cancellation status information from canceled workflows.

5. The computer-based system of claim 1, further comprising a monitor unit configured to transmit upon request of a respective initiating application a status of a workflow, comprising information as to the workflow's status as: in transit, in process, approved, rejected, or canceled.

6. The computer-based system of claim 5, wherein the monitor unit is configured to generate a flowchart of workflows in progress, wherein the position of each workflow is shown along its respective approval route.

7. The computer-based system of claim 1, further comprising a workflow callback unit configured to receive status information of respective workflows from the approval applications.

8. The computer-based system of claim 1, further comprising a completion callback unit configured to:

transmit status information of respective workflows from the workflow callback unit back to the initiating applications;

determine an approval rate of the respective workflows and, for workflows whose approval rate is less than 100%, query the initiating application as to whether it will supply a new or modified workflow to be launched by the modifier unit.

9. The computer-based system of claim 1, wherein the pre-defined maximum number of follow-up distributions is pre-encoded in the computer-based system.

10. The computer-based system of claim 9, wherein the pre-defined maximum number of follow-up distributions is selectable by a network user.

11. The computer-based system of claim 1, wherein a follow-up distribution of previously rejected workflows includes workflows that have been modified to increase a likelihood of approval.

12. The computer-based system of claim 1, wherein a rejection of a workflow by one approval application causes the workflow to be automatically recalled from all remaining members of the set of approval applications with approval status among the respective approval applications reported to the initiating application.

13. The computer-based system of claim 1, wherein the determination of the approval route of a workflow is modifiable dynamically in response to changes to the set of approval applications.

14. The computer-based system of claim 1, wherein additional workflows are addable to a stream of workflows dynamically and processed by respective sets of approval applications.

15. The computer-based system of claim 1, wherein an initiating application dynamically adds or removes an approval application from the set of approval applications determined at time of workflow initiation.

16. The computer-based system of claim 1, further comprising one or more approval layers, wherein an initiating application of a workflow specifies a first set of approval applications from which the workflow obtains all approvals before proceeding to a subsequent approval layer, and wherein one or more rejections at any approval layer cause the workflow to be automatically recalled from all remaining approval applications of the approval layer with status reported to the initiating application.

17. The computer-based system of claim 16, wherein a maximum number of approval layers is pre-encoded in the computer-based system.

18. The computer-based system of claim 17, wherein the maximum number of approval layers is selectable by a network user.

* * * * *